US 6,550,556 B2

(12) United States Patent
Middlemiss et al.

(10) Patent No.: US 6,550,556 B2
(45) Date of Patent: Apr. 22, 2003

(54) ULTRA HARD MATERIAL CUTTER WITH SHAPED CUTTING SURFACE

(75) Inventors: Stewart Middlemiss, Salt Lake City, UT (US); Ronald K. Eyre, Orem, UT (US)

(73) Assignee: Smith International, Inc, Houston, TX (US)

( * ) Notice: Subject to any disclaimer, the term of this patent is extended or adjusted under 35 U.S.C. 154(b) by 148 days.

(21) Appl. No.: 09/731,498

(22) Filed: Dec. 7, 2000

(65) Prior Publication Data

US 2002/0071729 A1 Jun. 13, 2002

(51) Int. Cl.[7] .............................................. E21B 10/46
(52) U.S. Cl. ........................ 175/430; 175/431; 175/434
(58) Field of Search ................................ 175/430, 431, 175/432, 426, 428, 434

(56) References Cited

U.S. PATENT DOCUMENTS

| 4,109,737 A | 8/1978 | Bovenkerk |
| 4,705,124 A | 11/1987 | Abrahamson et al. |
| 4,984,642 A | 1/1991 | Renard et al. |
| 4,997,049 A | 3/1991 | Tank et al. |
| 5,037,451 A | 8/1991 | Burnand et al. |
| 5,217,081 A | 6/1993 | Waldenström et al. |
| 5,351,772 A | 10/1994 | Smith |
| 5,379,854 A | 1/1995 | Dennis |
| 5,435,403 A | 7/1995 | Tibbitts |
| 5,449,048 A | 9/1995 | Thigpen et al. |
| 5,499,688 A | 3/1996 | Dennis |
| 5,544,713 A | 8/1996 | Dennis |
| 5,564,551 A | * 10/1996 | Frushour ................ 175/431 |
| 5,590,728 A | 1/1997 | Matthias et al. |
| 5,630,479 A | 5/1997 | Dennis |
| 5,655,612 A | 8/1997 | Grimes et al. |
| 5,743,346 A | 4/1998 | Flood et al. |
| 5,788,001 A | 8/1998 | Matthias et al. |
| 5,871,060 A | 2/1999 | Jensen et al. |
| 5,881,830 A | 3/1999 | Cooley |
| 5,957,228 A | * 9/1999 | Yorston et al. ........ 175/430 |
| 5,971,087 A | 10/1999 | Chaves |
| 5,979,577 A | 11/1999 | Fielder |
| 6,000,483 A | 12/1999 | Jurewicz et al. |
| 6,068,071 A | 5/2000 | Jurewicz |
| 6,082,474 A | * 7/2000 | Matthias ................ 175/432 |
| 6,196,340 B1 | 3/2001 | Jensen et al. ............ 175/431 |
| 6,199,645 B1 | * 3/2001 | Anderson et al. ........ 175/426 |
| 6,202,771 B1 | 3/2001 | Scott et al. ............. 175/432 |
| 6,244,365 B1 | * 6/2001 | Southland ............... 175/432 |
| 6,315,652 B1 | * 11/2001 | Snyder et al. ........... 451/540 |

FOREIGN PATENT DOCUMENTS

| GB | 2323398 A | 9/1998 |
| GB | 2339221 A | 1/2000 |

* cited by examiner

Primary Examiner—Frank Tsay
(74) Attorney, Agent, or Firm—Christie, Parker & Hale, LLP

(57) ABSTRACT

A cutting layer is provided having a radially extending depression formed on the exposed surface of the cutting element's cutting layer. A corresponding depression may be formed on the substrate end surface below the depression formed on the cutting layer. Furthermore, secondary shallower depressions may be formed on the cutting layer. The cutting element is typically mounted in a drag bit such that the cutting layer radially extending depression makes contact with the earth formations.

42 Claims, 9 Drawing Sheets

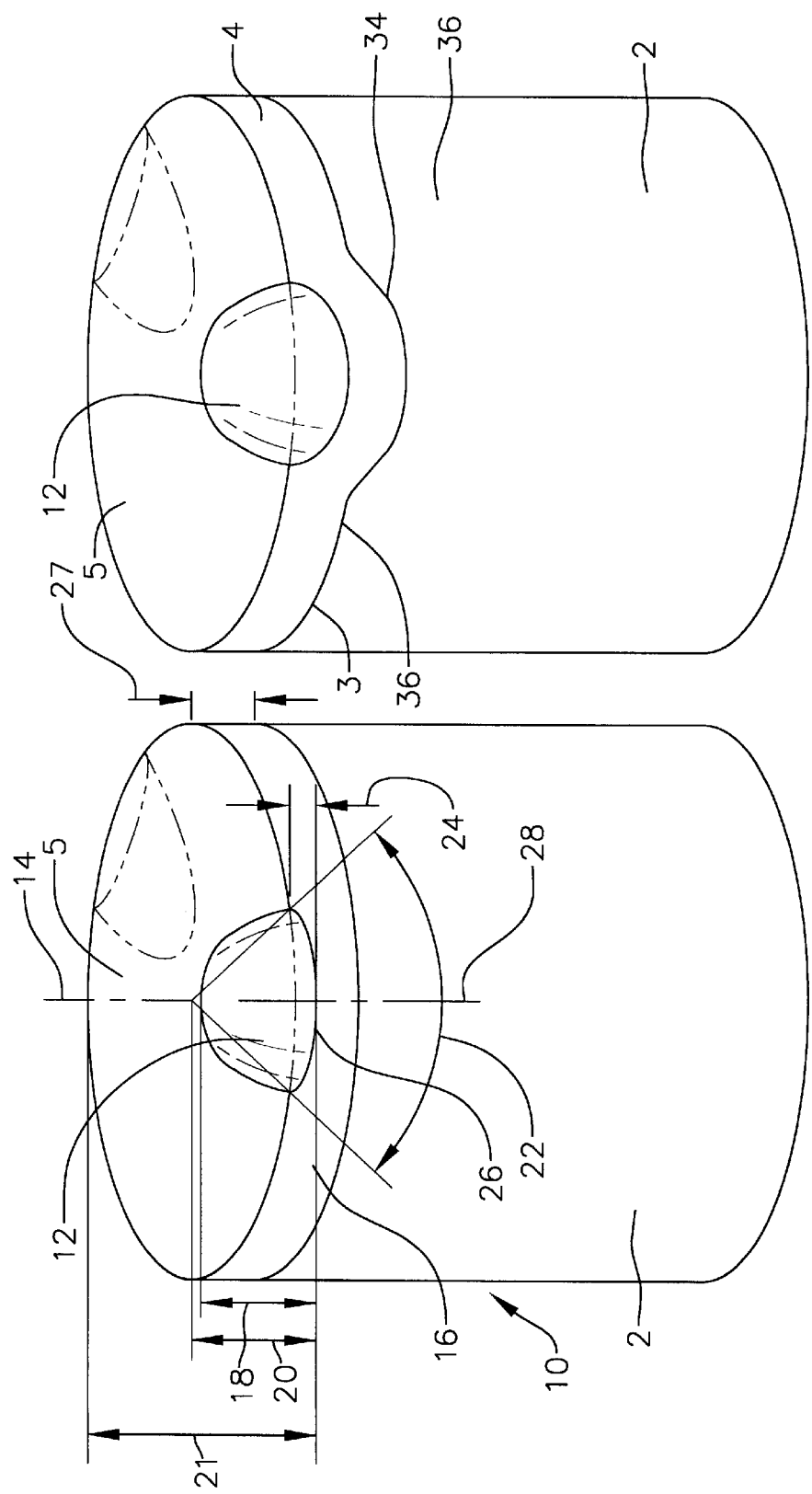

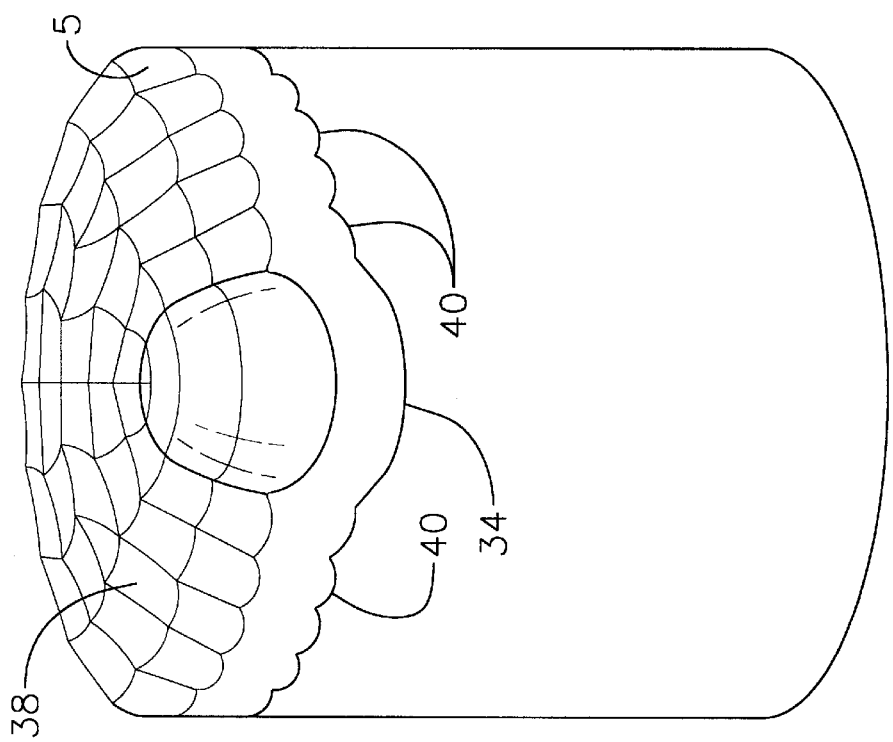
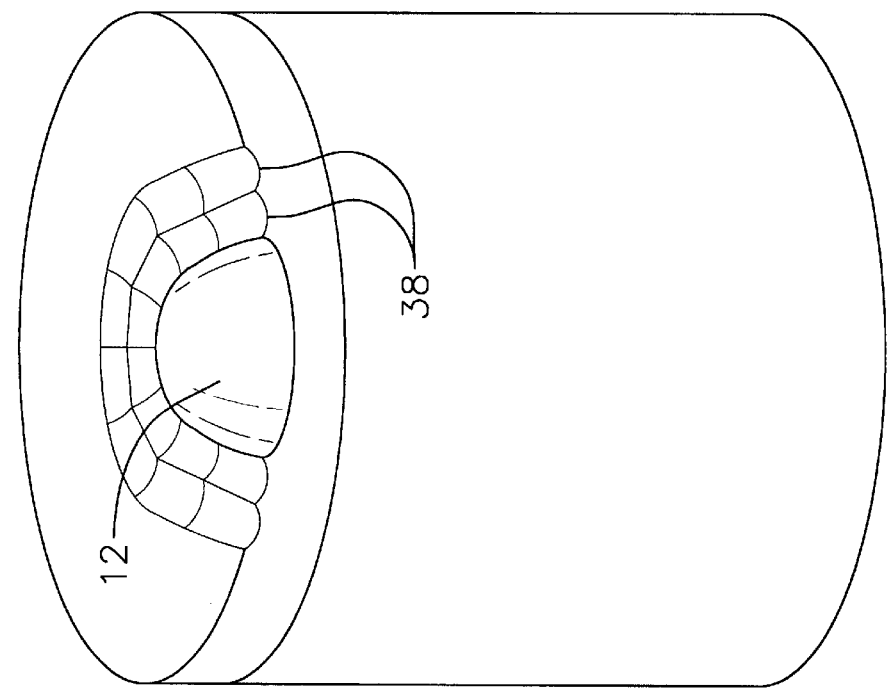

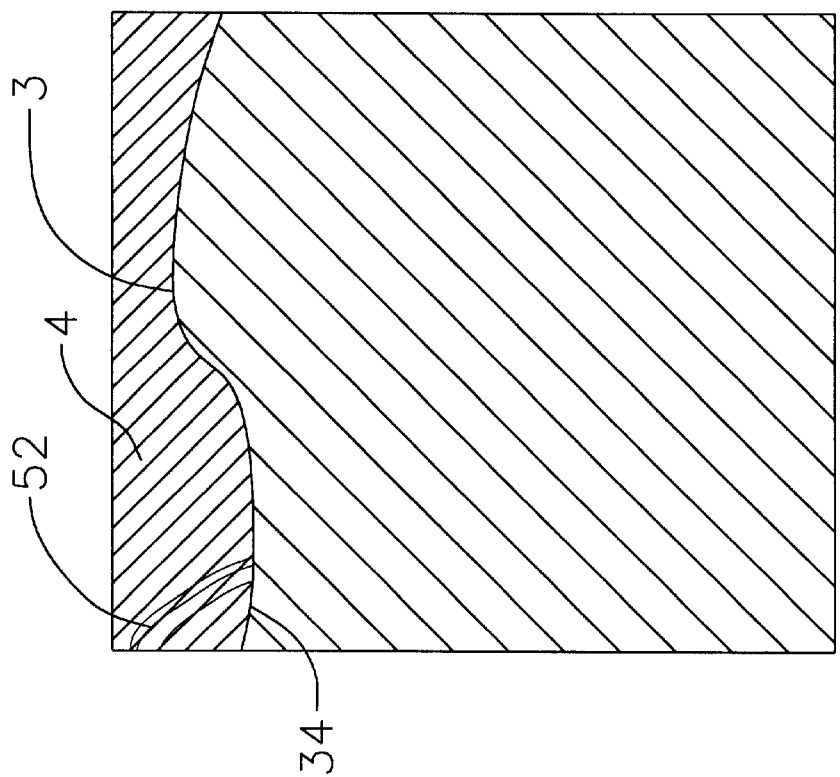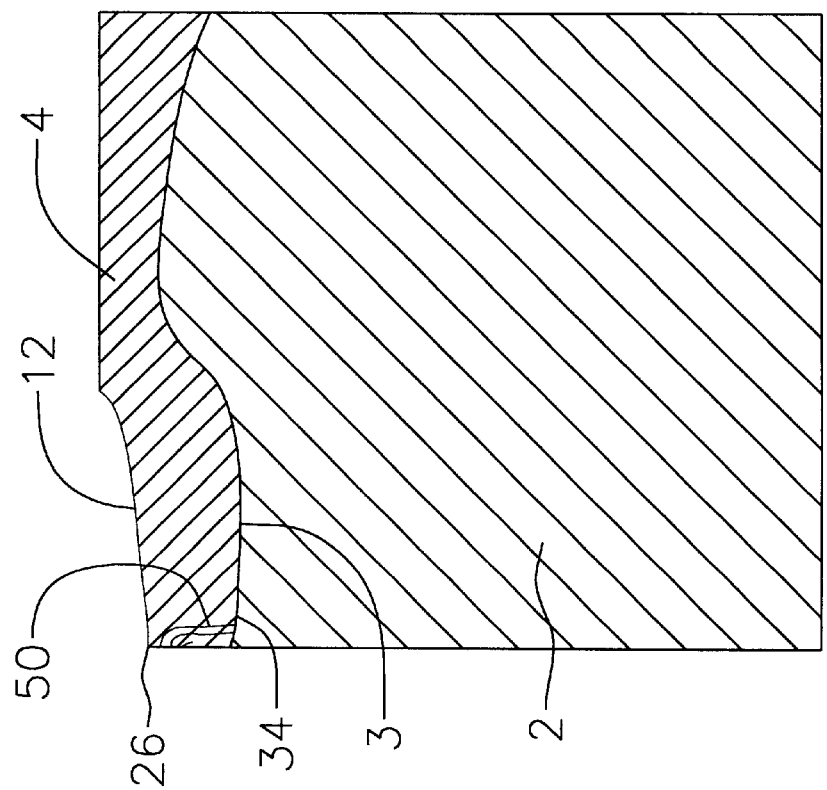

ULTRA HARD MATERIAL CUTTER WITH SHAPED CUTTING SURFACE

FIELD OF THE INVENTION

This invention relates to cutting elements used in drag bit for drilling earth formations. Specifically this invention relates to cutting elements having an ultra hard material layer having a shaped upper surface having a depression for contacting earth formations.

BACKGROUND OF THE INVENTION

A typical cutting element is shown in FIG. 1. The cutting element typically has cylindrical cemented carbide substrate body 2 having an end face or upper surface referred to herein as the "interface surface" 3. An ultra hard material layer 4, such as polycrystalline diamond or polycrystalline cubic boron nitride layer, having a first surface 9 bonded on to the interface surface and a second exposed surface 5 opposite the bonded surface, forms a cutting layer. The cutting layer can have a flat or a curved exposed surface 5.

Most commercially available cutting elements are made according to the teachings of U.S. Pat. No. 3,745,623, for example, whereby a relatively small volume of ultra hard particles such diamond or cubic boron nitride is sintered as a thin layer onto a cemented tungsten carbide substrate.

Generally speaking the process for making a cutting element employs a body of cemented tungsten carbide where the tungsten carbide particles are cemented together with cobalt. The carbide body is placed adjacent to a layer of ultra hard material particles such as diamond or cubic boron nitride particles and the combination is subjected to high temperature at a pressure where the ultra hard material particles are thermodynamically stable. This results in recrystallization and formation of a polycrystalline ultra hard material layer such as a polycrystalline diamond or polycrystalline cubic boron nitride layer on the interface surface 3 of the cemented tungsten carbide.

The problem with many cutting elements is the development of cracking, spalling, chipping and partial fracturing of the ultra hard material cutting layer at the layer's region subjected to the highest impact loads during drilling. This region is referred to herein as the "critical region". The critical region encompasses the portion of the cutting layer that makes contact with the earth formations during drilling. The problems at the critical region are caused by the generation of peak (high magnitude) stresses imposed on the ultra hard material layer at the critical region during drilling. Because the cutting elements are typically inserted into a drag bit at a rake angle, the critical region includes a portion of the ultra hard material layer near to and including a portion of the layer's circumferential edge 6 which makes contact with the earth formations during drilling. The peak stresses at the critical region result in the initiation and growth of cracks 7 across the cutting element. Consequently, cracks are formed of sufficient length for causing the separation of a sufficiently large piece of ultra hard material, rendering the cutting element ineffective or resulting in the failure of the cutting element. When this happens, drilling operations may have to be ceased to allow for recovery of the drag bit and replacement of the ineffective or failed cutting element.

Thus, cutting elements are desired that can better withstand high impact loading at the critical region imposed during drilling so as to have an enhanced operating life.

SUMMARY OF THE INVENTION

Cutting elements are provided having a substrate over which is coupled an ultra hard material cutting layer. A radially extending depression is formed up on the exposed surface of the ultra hard material layer, thus defining a "shaped" ultra hard material layer. The radially extending depression extends preferably from the location near the center of the ultra hard material layer to the periphery of the layer. In an alternate embodiment, more than one radially extending depression may be formed on the exposed surface of the ultra hard material cutting layer. In yet a further embodiment, one or more radially extended depressions may be formed on the substrate end surface coupled to the ultra hard material layer. In such case, each radially extending depression formed on the ultra hard material exposed surface is aligned over a radially extending depression formed on the substrate end surface. The ultra hard material layer may be draped over the end surface of the substrate and within the radially extending depression(s) formed on the substrate so as to define corresponding radially extending depression(s) on the exposed surface of the ultra hard material cutting layer.

In yet a further embodiment, a plurality of abutting depressions preferably having a depth shallower than the maximum depth of the radially extending depression may be formed abutting the radially extending depression. Corresponding shallow depressions may be formed on the substrate end surface which is coupled to the ultra hard material layer. Furthermore, one or multiple transition layers may be incorporated between the substrate and the ultra hard material layer. The transition layers have properties between the substrate and the ultra hard material layer. The transition layer may also have a radially extending depression(s) and/or secondary budding depressions formed on its surface furthest from the substrate. If the substrate end surface has depressions, the transition layer may also be draped over the substrate end surface so as to define corresponding depressions.

When mounted on a drag bit, a radially extending depression formed on the exposed surface of the ultra hard material layer is aligned to be within the critical region of the cutting element so that the peripheral edge of the cutting layer intersected by the radially extending depression makes contact with the earth formations during drilling.

With any embodiment, a circumferential groove may be formed on the outer surface of the body of the cutting element that spans an arc that is approximately the same as the arc spanned by the critical region of the cutting element. The groove is preferably symmetric about a diameter of the cutting element dissecting the central region. An ultra hard material is packed into the groove forming a secondary cutting surface for improving the cutting efficiency of the cutting element as well as delaying the erosion of the cutting element during drilling.

BRIEF DESCRIPTION OF THE DRAWINGS

FIG. 2 is a front perspective view of a cutting element of the present invention.

FIG. 4 is a front perspective view of another embodiment cutting element of the present invention.

FIG. 5 is a front perspective view of a yet further embodiment cutting element of the present invention.

FIG. 6 is a front perspective view of another embodiment of the present invention.

FIGS. 8A and 8B are cross-sectional views of cutting elements of the present invention depicting typical crack growth in such elements.

DETAILED DESCRIPTION

Figure 1:
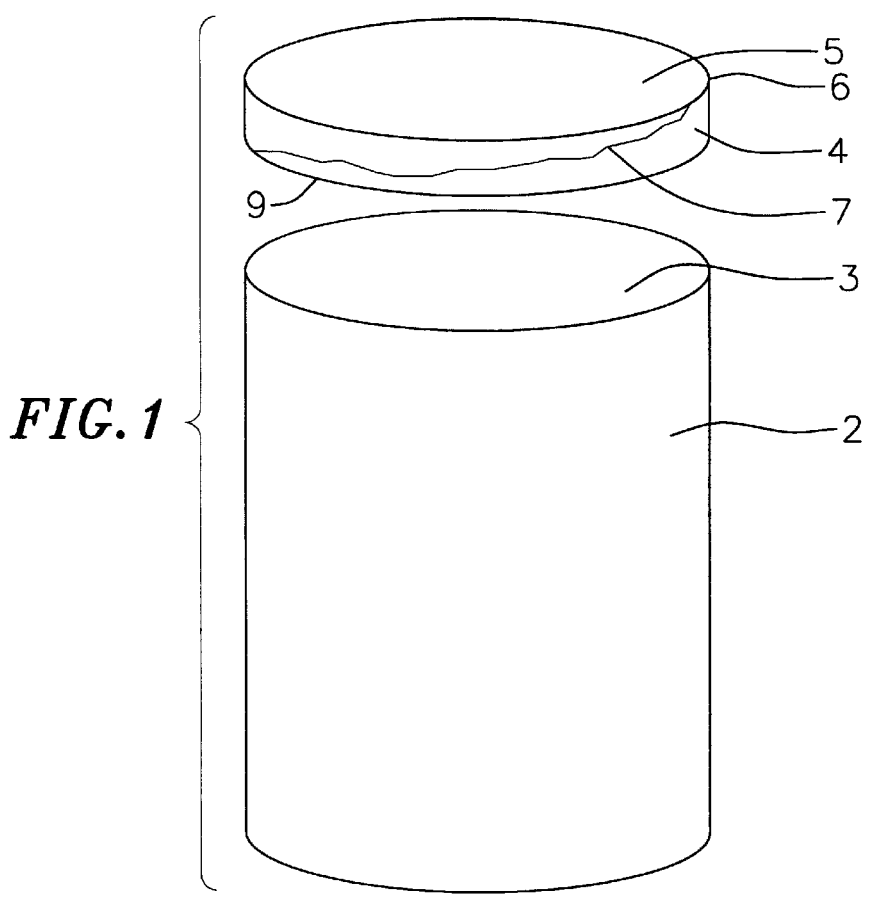
FIG. 1 is an exploded perspective view of a typical cutting element.

Cutting elements are provided having enhanced impact resistance capability at their critical region. A cutting element of the present invention includes a cylindrical substrate typically formed of cemented tungsten carbide over which is formed an ultra-hard material cutting layer which typically is either polycrystalline diamond (PCD) or polycrystalline cubic boron nitride (PCBN) layer.

The cutting layer has an exposed surface furthest away from the substrate. The cutting element may have a dome or convex shaped cutting layer exposed surface or a flat cutting layer exposed surface. The substrate may have a dome shaped or a flat interface surface over which is formed the ultra hard material cutting layer. The ultra hard material cutting layer may be shaped as necessary for forming the desired dome shaped or flat exposed surface. For example, if the substrate has a flat interface surface, the cutting layer may be a layer of uniform thickness thereby forming a cutting layer exposed surface which is flat, or the cutting layer may have a thickness that varies along a diameter such that the cutting layer exposed surface is domed shaped. For descriptive purposes, however, the present invention is described herein in terms of the cutting element having a substrate having a dome-shaped interface surface 3 and an ultra hard material layer having a relatively flat exposed surface 5. The cutting layers of the cutting elements of the present invention are shaped to have at least a depression defined on their exposed surfaces 5.

In one embodiment, a cutting element 10 is formed having a substantially concave depression 12 on the exposed surface 5 of the ultra hard material layer 4 (FIG. 2). For descriptive purposes, this depression is referred to herein as the "critical depression". The critical depression preferably begins near the central axis 14 of the cutting element and extends radially to the periphery 16 of the cutting layer. The critical depression length 18 is less than the diameter 21 and may be less than radius 20 of the cutting element. The critical depression may have a width which increases in the radially outward direction. At the periphery of the cutting element, the critical depression spans an arc 22 between 20° and 180° but preferably between 60° and 120° and more preferably about 90°. The depth 24 of the critical depression is less than the thickness 27 of the cutting layer at the cutting layer periphery 16. Preferably, the maximum depth of the critical depression is less than half of the thickness of the cutting layer at the cutting layer periphery 16. At the periphery of the cutting layer the critical depression defines a concave edge 26, referred to herein for descriptive purposes as the "critical cutting edge".

The critical depression depth may also increase in a radially outward direction. The critical depression may be symmetrical about its longitudinal axis 28. By having a width which increases in a radially outward direction as well as a depth which increases in a radially outward direction, the critical depression forms a scoop.

Figure 3:
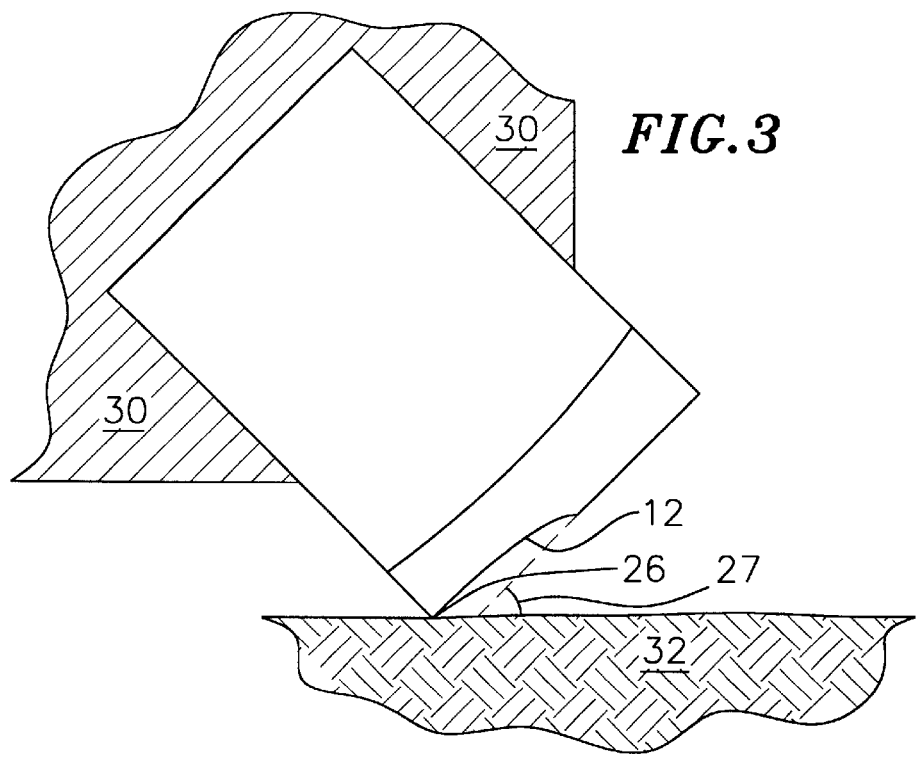
FIG. 3 is a partial cross-sectional view of a cutting element of the present invention mounted in a drag bit and making contact with an earth formation.
Figure 11:
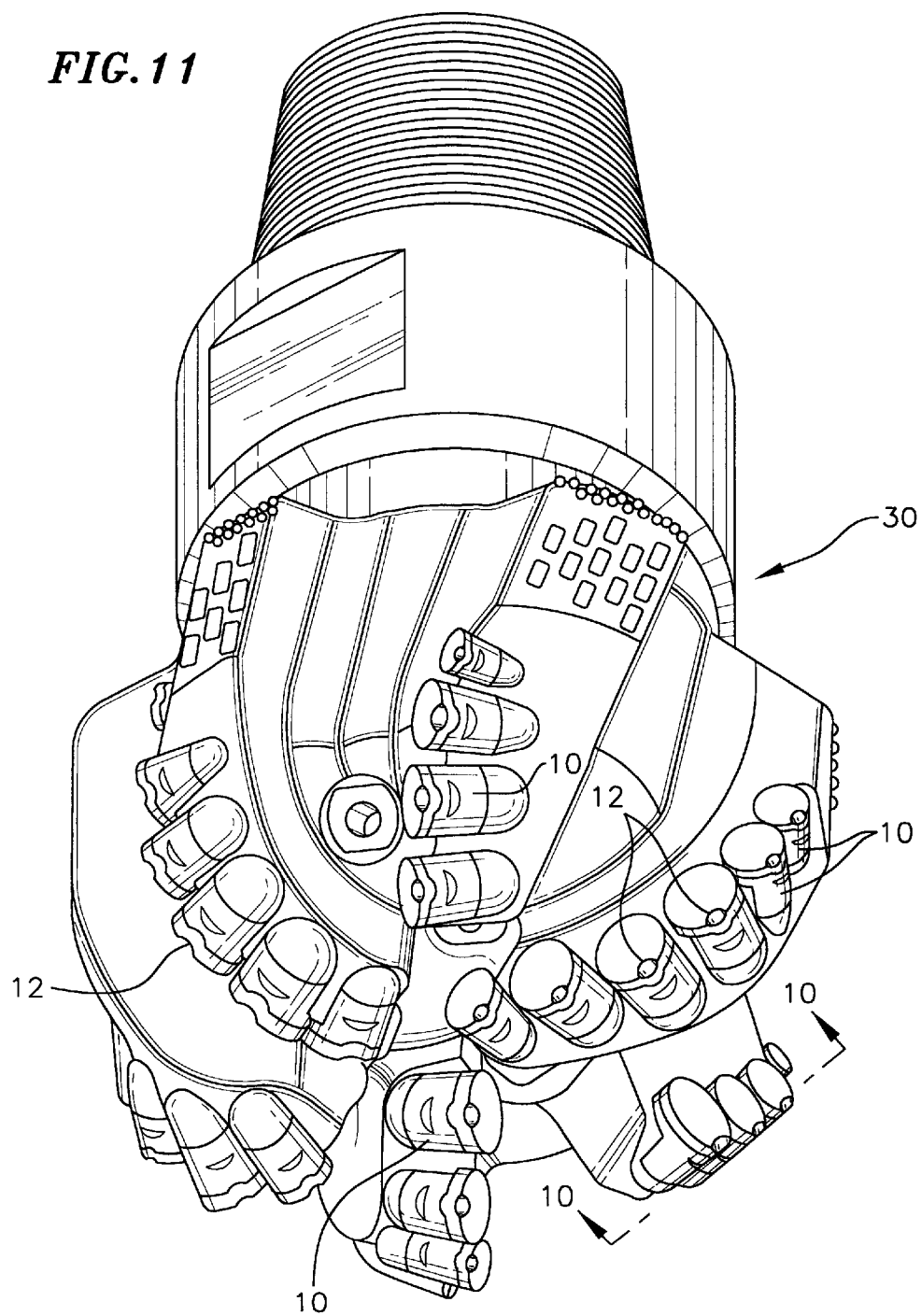
FIG. 11 is a perspective view of a rock bit incorporating cutting elements of the present invention.

The cutting element 10 is mounted on a drag bit body 30 at a rake angle 27 such that the critical depression 12 is aligned within the critical region such that the critical cutting edge 26 will come in contact with the earth formations 32 during drilling (FIGS. 3 and 11).

The critical depression may be formed on the ultra hard material layer by pressing the ultra hard material particles during sintering or it may be machined out of the exposed surface 5 of the ultra hard material after sintering, as for example by Electro Discharge Machining (EDM) or Electro Discharge Grinding (EDG).

The cutting layer may be formed by using a sheet of ultra hard material consisting of ultra hard material particles and a binder or by using a high shear compaction sheet of commingled ultra hard material particles and binder. The sheet is cut to the appropriate size for forming the cutting layer. The critical depression may be formed on the sheet by stamping, coining or other well known pressing procedures. The sheet with formed critical depression is then placed on the substrate interface surface with the surface of the sheet on which is formed the critical depression exposed. The substrate and sheet assembly is then sintered for forming the cutting element. Alternatively, the sheet is cut to size and placed over the substrate interface surface. The critical depression is then formed on the exposed surface of the sheet. The critical depression may also be formed on the exposed surface of the sheet during the sintering process by pressing.

In an alternate embodiment, a critical depression 34 is formed on the substrate interface surface 3 which extends radially to the substrate periphery 36 (FIG. 4). The substrate critical depression may also increase in width and in depth as it extends radially towards the periphery. Moreover, the substrate critical depression length may not be greater than the diameter of the substrate 2. The ultra hard material layer 4 may be formed by draping a sheet, such as a high shear compaction sheet of ultra hard material, over the interface surface of the substrate such that the ultra hard material sheet is draped within the substrate critical depression 34 thereby causing a corresponding critical depression 12 to be formed on the exposed surface 5 of the ultra hard material layer. The sheet may also have a pre-defined critical depression which is aligned with the critical depression formed on the substrate interface surface. Alternatively, ultra hard material powder may sintered on the substrate to form an ultra hard material layer which follows the contour of the substrate interface surface, thereby forming an exposed surface 5 having a critical depression 12 corresponding to the critical depression 34 on the substrate interface surface.

In a further alternate embodiment, an ultra hard material cutting layer is formed over the substrate interface surface having an exposed surface 5 having a critical depression 34. A critical depression is then formed on the exposed surface immediately over the critical depression of the substrate interface surface by machining as for example by EDM or EDG. With this embodiment, the cutting layer thickness may be varied such that it is thickest within the boundaries of the critical depression. The critical depression formed on the exposed surface of the cutting layer can be wider or narrower, longer or shorter than the critical depression formed on the substrate interface surface.

In yet a further embodiment, more than one critical depression may be formed on the exposed surface of the cutting layer as for example shown by the dashed lines in FIGS. 2 and 4. Corresponding critical depressions may also be formed on the substrate interface surface 3. By forming two or more critical depressions on the cutting layer exposed surface, an operator is able to remove, rotate and reinstall the cutting element in the drag bit body orienting a different critical depression within the critical region. In this regard, as the cutting layer is worn along the first critical depression, the cutting element can be rotated aligning the second critical depression within the critical region, thus, allowing the cutting element to be re-used. It is believed that impact roads will travel along the diameter of the cutting layer intersecting the cutting layer point of impact. As such, it is preferable that only the critical depression has its longitudinal central axis aligned with such a diameter, as for example shown in FIGS. 2 and 4.

In an alternate embodiment, a cutting element may be formed having an area of abutting shallow depressions 38 formed abutting the critical depression 12 on the cutting layer exposed surface 5 (FIG. 5). Each of the shallow depressions has a maximum depth as measured from a plane perpendicular to the central longitudinal axis of the cutting element that is smaller than the maximum depth of the critical depression as measured from the same plane. The shallow depressions may be formed on either side or surrounding the cutting layer critical depression(s) 12. Alternatively, the shallow depressions 38 may occupy the entire cutting layer exposed surface 5 that is not occupied by critical depression(s), as for example shown in FIG. 6. The shallow depressions may be formed simultaneously with the critical depression(s) during sintering or may be machined after sintering. In an alternate embodiment, shallow depressions 40 may be formed on the substrate interface surface (FIG. 6). The cutting layer 5 may be draped over the shallow depressions formed on the substrate interface surface such that the exposed cutting layer surface 5 follows the contours of the substrate interface surface. Moreover, a critical depression 34 may also be formed on the substrate interface surface adjacent to the shallow depressions. In this regard, if the cutting layer is draped over the substrate interface surface, a critical depression 12 will also be defined on the cutting layer exposed surface adjacent to shallow depressions 38. If the cutting layer is not draped over the substrate interface surface, then the cutting layer critical depression may be formed over the substrate critical depression by machining, as for example by EDM. Similarly, shallow depressions may also be formed on the cutting layer exposed surface adjacent the critical depression by machining. In further embodiments, a main depression may be formed next to the critical depression and secondary abutting shallow depressions may be formed in the main depression on the cutting layer exposed surface and may also be formed on the substrate interface surface.

Figure 7A:
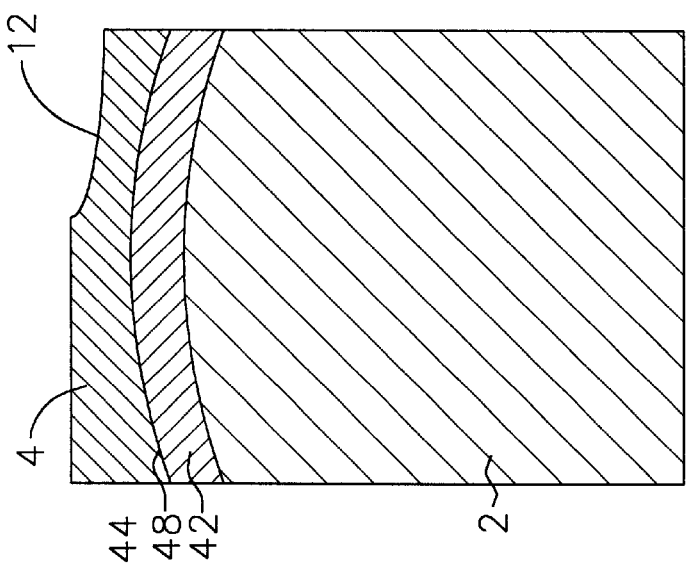
FIGS. 7A, 7B and 7C are cross-sectional views of cutting elements of the present invention incorporating transition layers.
Figure 7B:
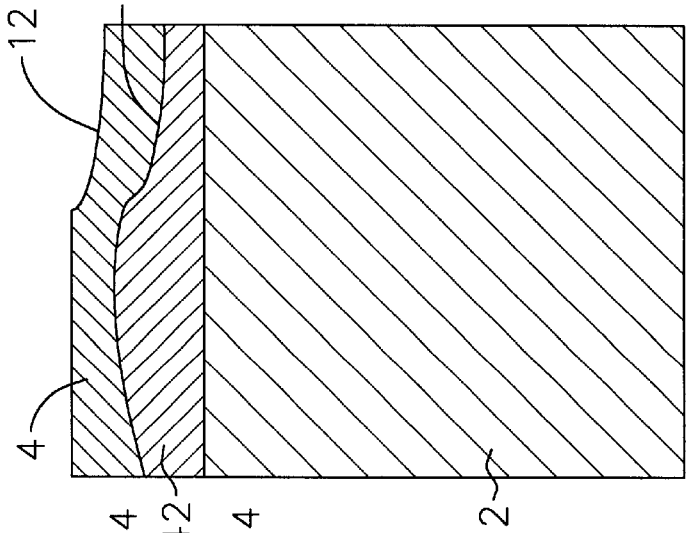
Figure 7C:
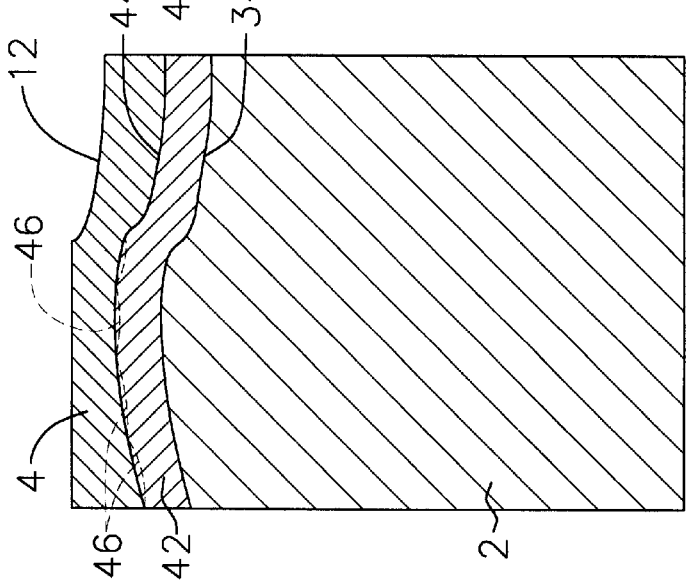

In an alternate embodiment, a transition layer 42 having properties intermediate between the substrate and the ultra hard material layer may be formed between the substrate 2 and the ultra hard material layer 4, as for example shown in FIGS. 7A, 7B, and 7C. The transition layer serves to reduce the magnitude of change of the properties between the substrate and the cutting layer of the cutting element. In this regard, the material properties from the substrate to the cutting layer are gradually changed thereby reducing the magnitude of the residual stresses that tend to form on the interface of the substrate and ultra hard material. A critical depression 44 or multiple critical depressions and/or shallow depressions 46 may be formed on the surface of the transition layer interfacing with the ultra hard material layer (FIGS. 7A and 7B). The shallow depressions may be formed surrounding the critical depression and may be formed within a main depression.

The transition layer critical and/or shallow depressions may be formed by pressing during the sintering process, or by preforming (e.g., by stamping, coining, etc.) on a sheet of transition material, or by draping the transition layer over corresponding depression(s) formed on the substrate interface surface. Alternatively, no depressions are formed on the transition layer surface 48 interfacing with the ultra hard material layer as shown in FIG. 7C. Moreover more than one transition layer may be used. In such case, each of the multiple transition layers may have the same properties or may have different properties. For example multiple transition layers may be used such that the transition layer closest to the substrate has properties closest to the substrate and each subsequent transition layer has properties that get closer to the properties of the ultra hard material layer. In this regard, a smoother transition of properties between the substrate and the ultra hard material layer occurs. Furthermore, a transition layer may be used to alter the shape of the interface surface 48 interfacing with the ultra hard material, layer.

In conducted tests, a cutting element having a critical depression formed on its interface surface as well as a critical depression formed on the exposed surface of the ultra hard material layer immediately above the interface surface critical depression, had an increase in impact load strength of about 50% when compared with a cutting element having the same critical depression formed on its substrate interface surface but not having a critical depression formed on the exposed surface of the ultra hard material layer.

When analyzing the failed cutting element with the critical depression on the cutting layer exposed surface, applicants noticed that sometimes the crack growth 50 which was initiated by the impact load began on the critical cutting edge 26 of the cutting layer 4 and turned abruptly towards the substrate interface surface 3 as for example shown in FIG. 8A. The crack growth 52 however on the cutting element without a critical depression on the cutting layer began on the cutting edge of the cutting layer 4 at the introduction of the impact loads and traveled inward and downward toward the substrate interface surface 3. In this regard, with the cutting element with the cutting layer critical depression, a smaller portion of the cutting layer failed and separated from the cutting element thereby allowing the cutting element to continue cutting.

Figure 8C:
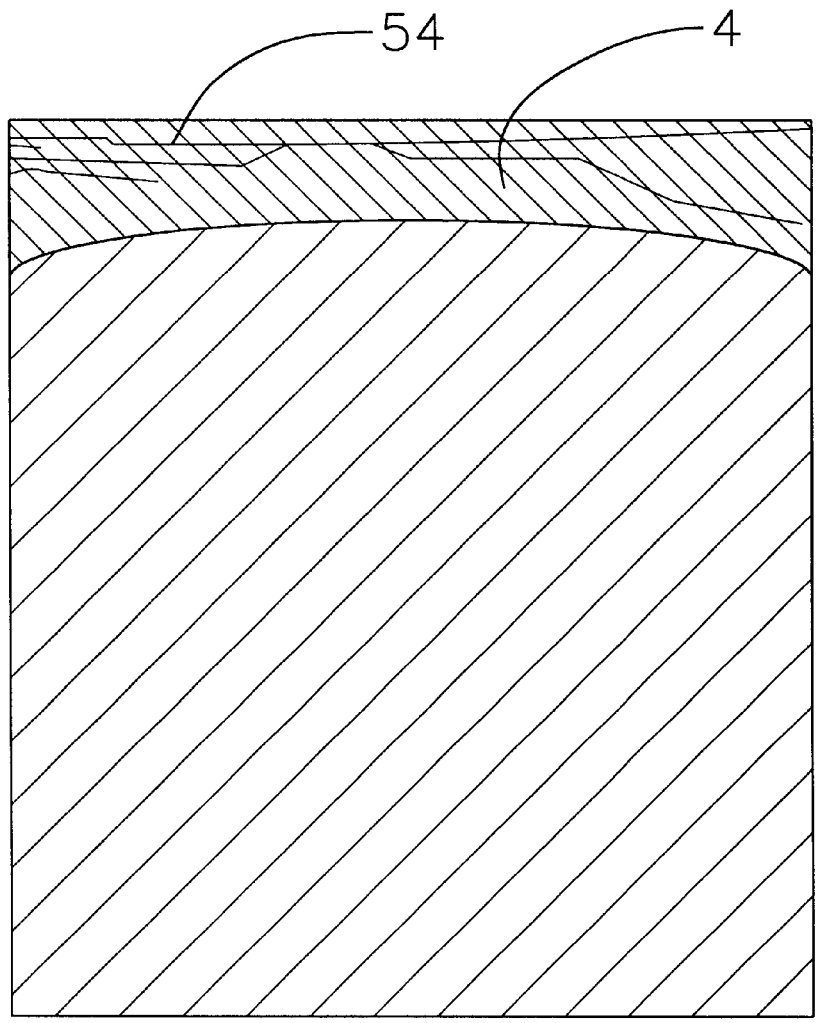
FIG. 8C is a cross-sectional view of a cutting element depicting crack growth through the cutting layer of such cutting element which is not shaped.

Applicants also discovered that by incorporating a substrate interface surface critical depression 34, the crack growth 50 or 52 progressed from the critical cutting edge 26 toward the substrate interface surface (FIGS. 8A and 8B) whereas in cutting elements not incorporating an ultra hard material layer critical depression 12 and a substrate critical depression 34, the crack growth 54 progressed from the impact area and across the entire ultra hard material layer causing the entire ultra hard material layer upper surface to split away from the cutting element resulting in the premature failure of the cutting element. (FIG. 8C). Moreover, because the failure occurred over the entire ultra hard material layer, the cutting element could not be reused by rotating.

Applicants believe that the increase in impact strength in the inventive cutting elements is caused by the re-distribution of residual stresses caused by the incorporation of the critical depression in the cutting element layer and substrate. Similar favorable re-distribution of residual stresses is caused by the incorporation of the abutting shallow depressions on the cutting layer and/or substrate.

Figure 9A:
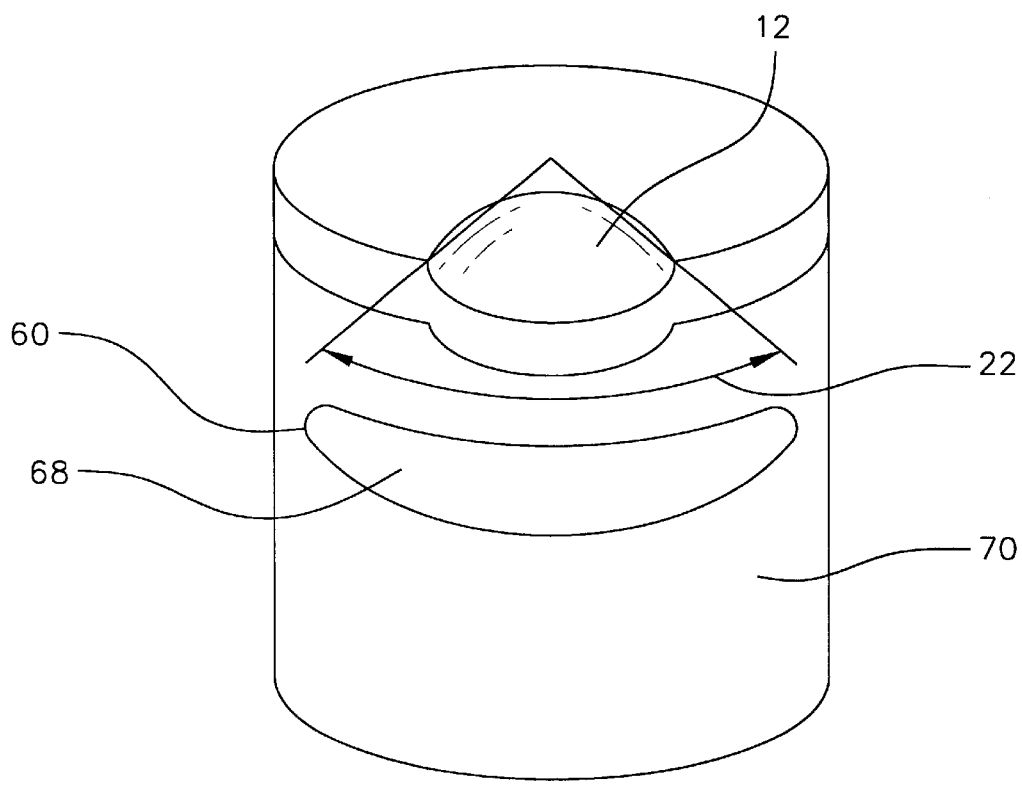
FIG. 9A is a perspective view of another embodiment cutting element of the present invention incorporating a secondary cutting surface.
Figure 9B:
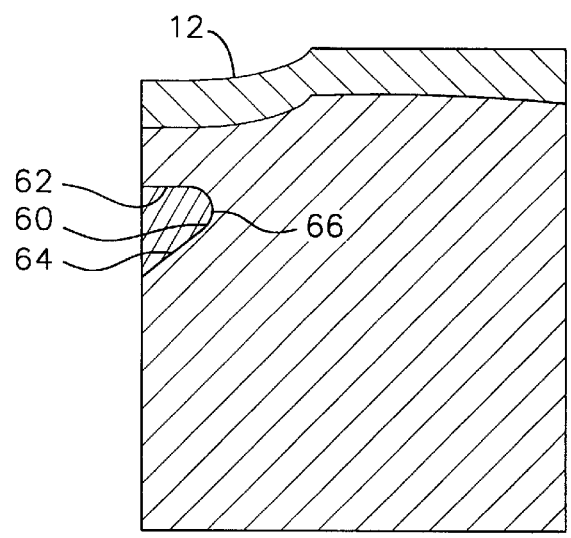
FIG. 9B is a cross-sectional view of the cutting element shown in FIG. 9A.

Furthermore, with any of these embodiments, a circumferential groove 60 may be formed on the cylindrical outer surface 70 of the substrate 2 in a location below the critical depression (FIG. 9A). Preferably, the groove spans an arc equal or slightly greater than the arc 22 span by the critical depression. In cross-section, preferably the groove has a horizontal upper side wall 62 and a slanted lower side wall 64 with a round bottom 66 therebetween (FIG. 9B). The slanted lower side wall slants in the direction opening the groove. The circumferential groove is preferably symmetric about a plane through a diameter bisecting the critical depression. Applicant has discovered that the geometry of this groove reduces the level of the stresses generated at and around the groove. Moreover, the slanted wall of the groove provides for a groove geometry that is easier to pack with ultra hard material for forming a secondary cutting surface, thereby making the manufacture of the cutting element easier and less costly.

Figure 10:
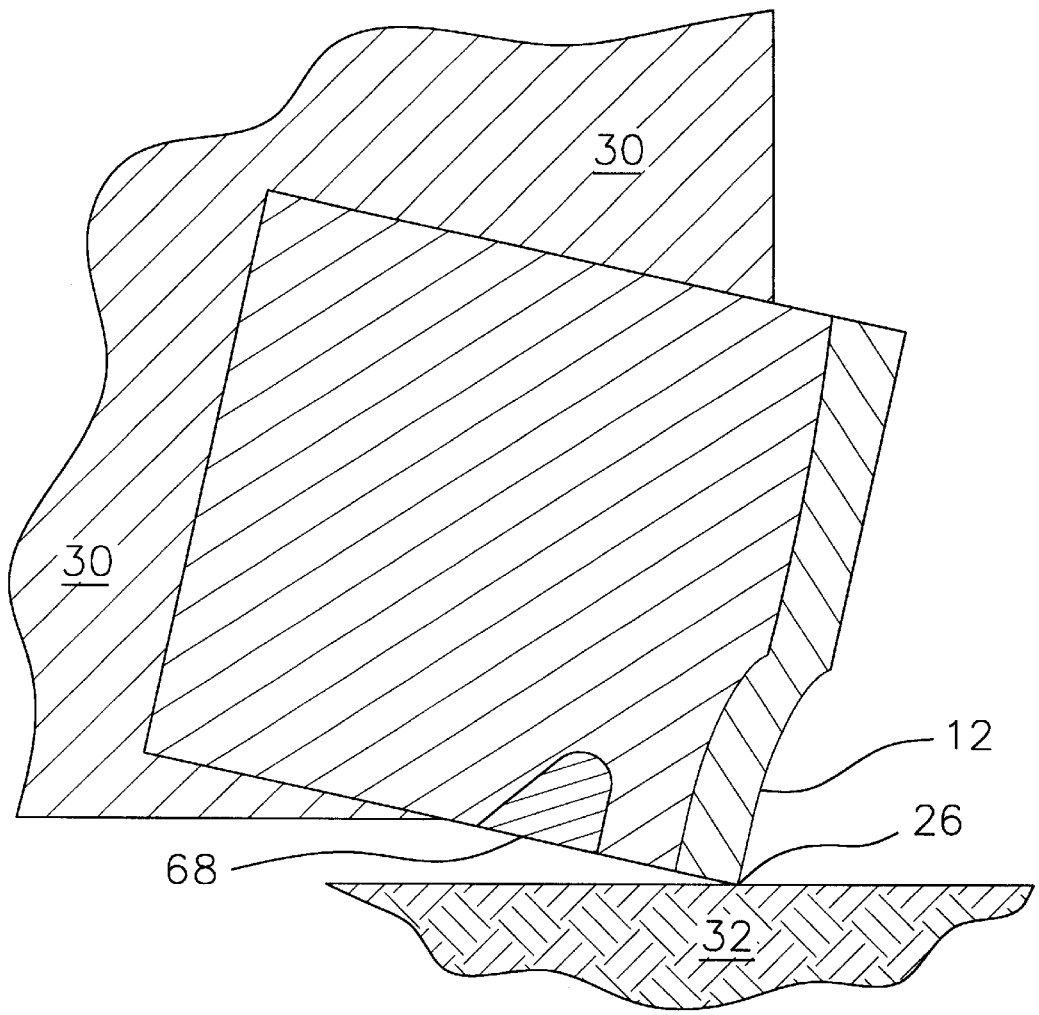
FIG. 10 is a cross-sectional view of the cutting element shown in FIG. 9A mounted in a bit body and contacting an earth formation during drilling.

Ultra hard material is bonded into the circumferential groove forming a secondary cutting surface 68. This secondary cutting surface serves two purposes. First it serves as an additional cutting surface, increasing the cutting efficiency of the cutting element. Second, it delays the erosion and wear of the cutting element body that occurs when the cutting element body is allowed to make contact with the earth formation 32 during drilling (FIG. 10). More importantly however, has been the unexpected result of an increase in the impact strength of the cutting element by the incorporation of this secondary cutting surface.

Testing has revealed an increase of approximately 58% in impact strength for cutting elements having a critical depression formed on their substrate interface surface and a critical depression formed on their ultra hard material layer and incorporating a secondary cutting surface below their critical depression, over the same cutting elements not incorporating a secondary cutting surface. This has been an unexpected result because the impact strength of the cutting elements only having a critical depression formed on their substrate interface surface is greater than the impact strength of the cutting elements having a critical depression formed on their substrate interface surface and incorporating a secondary cutting surface below their critical depression.

Samples of cutting elements having a critical depression on their substrate interface surface and on their ultra hard material cutting layer as well as a secondary cutting surface were sectioned and examined prior to failure after being subjected to impact load testing. Cracks within the ultra hard material cutting layer showed little tendency to form large spalls and many of the cracks turned downward toward the substrate interface surface and often terminated within the cutting layer before reaching the substrate interface surface. The fact that these cutters withstood multiple severe impacts despite containing large cracks indicates that there is considerable damage tolerance in the geometry of a cutting element incorporating a critical depression in the cutting layer, a critical depression in the substrate interface surface, and a secondary cutting surface.

Applicants, have come up with two theories for explaining the unexpected high strength behavior of these cutting elements. The first theory is that a reduction or change in the residual stresses in the scoop area defined by the critical depression in the substrate interface surface and critical depression in the cutting layer occurs due to the incorporation of the secondary cutting surface. These residual stresses which are generated due to cool down from the high pressure, high temperature of sintering may be substantially different from similar cutting elements not incorporating the secondary cutting surface. The residual stresses may be distributed in a manner that results in the inhibition of crack initiation or in crack arrest due to the secondary cutting surface.

The second theory is based on stress wave/cutting element shape interactions. Impact loading a structure at high rates results in the generation of stress waves initiating at the side of impact and radiating into the material at speeds which are governed by the material elastic properties. These stress waves are modified by interactions with discontinuities in the material, geometry (e.g., surfaces and interfaces). Interaction between primary stress waves and secondary (e.g. reflected or refracted) stress waves is very complex, but may lead to the reduction of peak stresses within the structure. It appears that in the cutting elements incorporating a critical depression on the substrate interface surface and on the cutting layer, and a secondary cutting surface, the interaction of the stress waves leads to a reduction in peak stresses within the cutting element structure.

The cutting elements of the present invention are mounted in a bit body 30 (FIG. 11) and are oriented such that the critical region of each insert is positioned to engage the earth's formation at the edge 26 of the cutting layer which will make contact with the earth formation during drilling (FIGS. 3 and 10). Moreover, by doing so, the secondary cutting surface 68 of each cutting elements will also be aligned to eventually contact the earth formation. Consequently, the cutting efficiency is increased and erosion and wear of such cutting element is delayed.

Although the present invention has been described and illustrated to respect to multiple embodiments thereof, it is to be understood that it is not to be so limited, since changes and modifications may be made therein which are within the full intended scope of this invention as hereinafter claimed.

What is claimed is:

1. A cutting element comprising:
   a substrate having an interface surface and a substrate periphery;
   a substrate depression formed on the interface surface extending radially outward to the substrate periphery;
   an ultra hard material layer coupled to the interface surface and having an exposed surface and an ultra hard material layer periphery; and
   an ultra hard material layer depression formed on the exposed surface and extending radially outward along the exposed surface to the periphery of the ultra hard material layer, wherein the ultra hard material depression is aligned over the substrate depression.

2. A cutting element as recited in claim 1 wherein the ultra hard material depression begins near the center of the ultra hard material exposed surface and extends to the cutting layer periphery.

3. A cutting element as recited in claim 1 wherein the substrate depression begins near the center of the substrate and extends to the substrate periphery.

4. A cutting element as recited in claim 1 wherein the ultra hard material depression increases in depth and increases in width in a radially outward direction.

5. A cutting element as recited in claim 1 wherein the substrate depression increases in depth and increases in width in a radially outward direction.

6. A cutting element as recited in claim 1 further comprising a second ultra hard material layer depression extending radially outward to the ultra hard material layer periphery.

7. A cutting element as recited in claim 1 further comprising a plurality of abutting secondary depressions formed on the ultra hard material layer exposed surface abutting the radially extending depression formed on the ultra hard material layer, wherein each of said ultra hard material secondary depression abuts another one of said ultra hard material secondary depressions.

8. A cutting element as recited in claim 7 further comprising a plurality of abutting secondary depressions formed on the substrate interface surface abutting the radially extending depression formed on the substrate interface surface, wherein each of said substrate secondary depression abuts another one of said substrate secondary depressions.

9. A cutting element as recited in claim 8 wherein each secondary depression formed on the ultra hard material layer corresponds to and is formed over a corresponding secondary depression formed on the substrate interface surface.

10. A cutting element as recited in claim 9 further comprising a transition layer between the ultra hard material layer and the substrate interface surface, wherein the transition layer is draped over the substrate interface surface thereby defining a radially extending transition layer depression corresponding to the substrate radially extending depression and secondary transition layer depressions corresponding to the substrate secondary depressions.

11. A cutting element as recited in claim 8 herein of each ultra hard material secondary depression has a maximum depth, wherein the ultra hard material radially extending depression has a maximum depth, wherein each of the substrate secondary depressions has a maximum depth, wherein the substrate radially extending depression has a maximum depth, wherein the maximum depth of the each ultra hard material secondary depression is shallower than the maximum depth of the ultra hard material radially extending depression, and wherein each of the substrate secondary depressions maximum depth is shallower than the maximum depth of the substrate radially extending depression.

12. A cutting element as recited in claim 7 further comprising a main depression abutting said radially extending depression formed on the ultra hard material layer, wherein said plurality of abutting secondary depressions are formed within the main depression.

13. A cutting element as recited in claim 12 further comprising a plurality of abutting secondary depressions formed on the substrate interface surface abutting the radially extending depression formed on the substrate interface surface, wherein each of said substrate secondary depression abuts another one of said substrate secondary depressions, and wherein said secondary depressions are formed within a main depression formed on the substrate interface surface.

14. A cutting element as recited in claim 1 wherein the ultra hard material layer has a substantially constant thickness.

15. A cutting element as recited in claim 1 further comprising a second ultra hard material layer depression formed on the exposed surface and extending radially outward to the periphery of the ultra hard material layer.

16. A cutting element as recited in claim 15 wherein the first ultra hard material layer depression has a first radially extending longitudinal central axis, and wherein the second ultra hard material layer depression has a second radially extending longitudinal central axis, wherein the two axis are oriented at an angle not equal to 180° relative to each other.

17. A cutting element as recited in claim 15 further comprising a second substrate depression formed on the interface surface extending radially outward to the substrate periphery, wherein the substrate second depression is aligned with the second ultra hard material layer depression.

18. A cutting element as recited in claim 1 further comprising
 a circumferential groove formed on the substrate below the substrate depression; and
 ultra hard material within the groove.

19. A cutting element as recited in claim 18 wherein the circumferential groove comprises:
 a first surface;
 a second surface further from the substrate depression than the first surface and opposite the first surface; and
 a concave surface joining the first and second surfaces, forming a groove having a concave bottom wherein the second surface is concave along its length.

20. A cutting element as recited in claim 19 wherein the first surface is relatively horizontal and wherein the second surface slopes away from the first surface in an outward direction.

21. A cutting element as recited in claim 18 wherein the groove spans only a portion of the circumference.

22. A cutting element as recited in claim 18 wherein the groove comprises a first and a second end and wherein the groove has a width as measured axially along the outer surface of the body, wherein said width is minimum at the first and second ends and maximum at about the groove mid length.

23. A cutting element as recited in claim 1 further comprising a transition layer between the substrate interface surface and the ultra hard material layer.

24. A cutting element comprising:
 a substrate having an interface surface and a substrate periphery;
 an ultra hard material layer coupled to the interface surface and having an exposed surface and an ultra hard material layer periphery; and
 an ultra hard material layer depression formed on the exposed surface and extending radially outward to the periphery of the ultra hard material layer; and
 a plurality of secondary depressions formed abutting and surrounding said radially extending depression wherein each of said secondary depressions is abutting another one of said secondary depressions, and wherein the radially extending depression has a maximum depth and wherein each secondary depression has a maximum depth shallower than the maximum depth of the radially extending depression.

25. A cutting element as recited in claim 24 further comprising a depression formed on the substrate interface surface extending to the periphery of the substrate.

26. A cutting element as recited in claim 25 further comprising a plurality of substrate secondary depressions formed abutting the substrate radially extending depression wherein each of the substrate secondary depressions abuts another of the substrate secondary depressions.

27. A cutting element as recited in claim 26 further comprising a transition layer between the substrate interface surface and the ultra hard material layer, wherein the transition layer is draped over the substrate interface surface defining a radially extending depression corresponding to the ultra hard material layer radially extending depression and defining a plurality of secondary depressions corresponding to the substrate secondary depressions.

28. A cutting element as recited in claim 24 wherein the ultra hard material layer has a substantially constant thickness.

29. A cutting element as recited in claim 24 further comprising a transition layer between the substrate interface surface and the ultra hard material layer, wherein the transition layer defines a radial depression corresponding to the ultra hard material layer radial depression, and wherein the transition layer defines a plurality of secondary depressions corresponding to the secondary depressions on the ultra hard material layer.

30. A cutting element as recited in claim 24 wherein the ultra hard material depression increases in depth and increases in width in a radially outward direction.

31. A cutting element as recited in claim 24 further comprising:
   a circumferential groove formed on the substrate below the ultra hard material layer depression; and
   ultra hard material within the groove.

32. A cutting element as recited in claim 31 wherein the groove comprises a first and a second end and wherein the groove has a width as measured axially along the outer surface of the body, wherein said width is minimum at the first and second ends and maximum at about the groove mid length.

33. A cutting element comprising:
   a substrate;
   a transition layer formed over the substrate, the transition layer having a periphery and an interface surface;
   a transition layer depression formed on the interface surface extending radially outward to the periphery;
   an ultra hard material layer formed over the transition layer and having an exposed surface and an ultra hard material layer periphery; and
   an ultra hard material layer depression formed on the exposed surface and extending radially outward to the periphery of the ultra hard material layer.

34. A cutting element as recited in claim 33 wherein the ultra hard material depression is aligned over the transition layer depression.

35. A drag bit comprising a plurality of cutting elements, each cutting element comprising:
   a substrate having an interface surface and a substrate periphery;
   a substrate depression formed on the interface surface extending radially outward to the substrate periphery;
   an ultra hard material layer coupled to the interface surface and having an exposed surface and an ultra hard material layer periphery; and
   an ultra hard material layer depression formed on the exposed surface and extending radially outward along the exposed surface to the periphery of the ultra hard material layer, wherein the ultra hard material depression is aligned over the substrate depression.

36. A drag bit as recited in claim 35 wherein a cutting element further comprises a transition layer between the substrate interface surface and the ultra hard material layer.

37. A drag bit as recited in claim 36 wherein a cutting element further comprises:
   a plurality of abutting secondary depressions formed on the ultra hard material layer exposed surface abutting the radially extending depression formed on the ultra hard material layer, wherein each of said ultra hard material secondary depression abuts another one of said ultra hard material secondary depressions.

38. A drag bit as recited in claim 37 wherein a cutting element further comprises a plurality of abutting secondary depressions formed on the substrate interface surface abutting the radially extending depression formed on the substrate Interface surface, wherein each of said substrate secondary depression abuts another one of said substrate secondary depressions.

39. A drag bit as recited in claim 38 wherein a cutting element secondary depression formed on the ultra hard material layer corresponds to and is formed over a corresponding secondary depression formed on the substrate interface surface.

40. A drag bit as recited in claim 35 wherein a element further comprises:
   a circumferential groove formed on the substrate below the substrate depression; and ultra hard material within the groove.

41. A cutting element comprising:
   a substrate having an interface surface and a substrate periphery;
   a substrate depression formed on the interface surface extending to the substrate periphery;
   an ultra hard material layer coupled to the interface surface and having an exposed surface and an ultra hard material layer periphery; and
   an ultra hard material layer depression formed on the exposed surface and extending along the exposed surface to the periphery of the ultra hard material layer, wherein the ultra hard material depression is aligned over the substrate depression.

42. A cutting element comprising:
   a substrate having an interface surface and a substrate periphery;
   a substrate depression formed on the interface surface extending to the substrate periphery;
   an ultra hard material layer coupled to the interface surface and having an a first surface opposite a second surface and an ultra hard material layer periphery, wherein the second surface is further from the interface surface than the first surface; and
   an ultra hard material layer depression formed on the second surface and extending along the second surface to the periphery of the ultra hard material layer, wherein the ultra hard material depression is aligned over the substrate depression.

* * * * *